US009953644B2

(12) United States Patent
Selfridge et al.

(10) Patent No.: US 9,953,644 B2
(45) Date of Patent: Apr. 24, 2018

(54) TARGETED CLARIFICATION QUESTIONS IN SPEECH RECOGNITION WITH CONCEPT PRESENCE SCORE AND CONCEPT CORRECTNESS SCORE

(71) Applicant: AT&T Intellectual Property I, L.P., Atlanta, GA (US)

(72) Inventors: Ethan Selfridge, Somerville, NJ (US); Michael J. Johnston, New York, NY (US); Svetlana Stoyanchev, Jersey City, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 157 days.

(21) Appl. No.: 14/557,030

(22) Filed: Dec. 1, 2014

(65) Prior Publication Data

US 2016/0155445 A1    Jun. 2, 2016

(51) Int. Cl.
*G10L 15/22* (2006.01)
*G10L 15/18* (2013.01)
*G10L 15/01* (2013.01)

(52) U.S. Cl.
CPC .......... *G10L 15/22* (2013.01); *G10L 15/1822* (2013.01); *G10L 15/01* (2013.01); *H04M 2250/74* (2013.01)

(58) Field of Classification Search
CPC ... G10L 15/18; G10L 15/22; G10L 2015/225; G10L 15/1822
USPC ........................................ 704/236, 257, 275
See application file for complete search history.

(56) References Cited

U.S. PATENT DOCUMENTS

| 6,044,347 A * | 3/2000 | Abella ..................... G10L 15/18 704/272 |
| 6,246,981 B1 * | 6/2001 | Papineni .................. G10L 15/22 704/235 |
| 6,567,778 B1 * | 5/2003 | Chao Chang ......... G06F 17/278 704/257 |
| 6,571,210 B2 | 5/2003 | Hon et al. |

(Continued)

OTHER PUBLICATIONS

Denecke et al., "Dialogue Strategies Guiding Users to Their Communicative Goals", Eurospeech 1997, 4 Pages.*

(Continued)

*Primary Examiner* — Martin Lerner (57) ABSTRACT

A system, method and computer-readable storage devices are disclosed for using targeted clarification (TC) questions in dialog systems in a multimodal virtual agent system (MVA) providing access to information about movies, restaurants, and musical events. In contrast with open-domain spoken systems, the MVA application covers a domain with a fixed set of concepts and uses a natural language understanding (NLU) component to mark concepts in automatically recognized speech. Instead of identifying an error segment, localized error detection (LED) identifies which of the concepts are likely to be present and correct using domain knowledge, automatic speech recognition (ASR), and NLU tags and scores. If at least concept is identified to be present but not correct, the TC component uses this information to generate a targeted clarification question. This approach computes probability distributions of concept presence and correctness for each user utterance, which can apply to automatic learning for clarification policies.

20 Claims, 3 Drawing Sheets

(56) References Cited

U.S. PATENT DOCUMENTS

| | | | |
|---|---|---|---|
| 7,139,717 B1* | 11/2006 | Abella | G10L 15/1822 704/251 |
| 7,475,015 B2 | 1/2009 | Smith et al. | |
| 7,493,257 B2* | 2/2009 | Kim | G10L 15/22 704/231 |
| 7,502,738 B2* | 3/2009 | Kennewick | G10L 15/22 704/257 |
| 7,870,000 B2 | 1/2011 | Ativanichayaphong et al. | |
| 7,949,525 B2 | 5/2011 | Hakkani-Tur et al. | |
| 7,996,218 B2 | 8/2011 | Kim et al. | |
| 8,315,870 B2 | 11/2012 | Hanazawa | |
| 8,355,920 B2 | 1/2013 | Gopinath et al. | |
| 8,407,051 B2 | 3/2013 | Inoue et al. | |
| 8,639,509 B2 | 1/2014 | Weng et al. | |
| 8,645,136 B2 | 2/2014 | Milstein | |
| 8,886,532 B2 | 11/2014 | Levit et al. | |
| 9,158,759 B2* | 10/2015 | Pradhan | G06F 17/28 |
| 9,412,363 B2* | 8/2016 | Sarikaya | G10L 15/1815 |
| 2003/0233230 A1* | 12/2003 | Ammicht | G10L 15/183 704/235 |
| 2004/0044952 A1* | 3/2004 | Jiang | G06F 17/30616 715/256 |
| 2005/0096913 A1* | 5/2005 | Coffman | G10L 15/22 704/275 |
| 2008/0201133 A1* | 8/2008 | Cave | G10L 15/1815 704/10 |
| 2008/0243514 A1* | 10/2008 | Gopinath | G10L 15/22 704/270 |
| 2010/0057463 A1* | 3/2010 | Weng | G10L 15/22 704/257 |
| 2010/0114944 A1* | 5/2010 | Adler | G10L 15/22 707/770 |
| 2013/0290100 A1* | 10/2013 | Oro | G06F 17/30864 705/14.54 |
| 2013/0346066 A1 | 12/2013 | Deoras et al. | |
| 2014/0316764 A1* | 10/2014 | Ayan | G10L 15/22 704/9 |
| 2014/0324429 A1* | 10/2014 | Weilhammer | G10L 15/063 704/244 |

OTHER PUBLICATIONS

Stoyanchev et al., "Localized Error Detection for Targeted Clarification in a Virtual Assistant", 2015 IEEE International Conference on Acoustics, Speech and Signal Processing (ICASSP), 19-24 2015, pp. 5241 to 5245.*

Ayan, Necip Fazil, et al. ""Can you give me another word for hyperbaric?" Improving speech translation using targeted clarification questions." Acoustics, Speech and Signal Processing (ICASSP), 2013 IEEE International Conference on. IEEE, 2013.

Pincus, Eli, Svetlana Stoyanchev, and Julia Hirschberg. "Exploring features for localized detection of speech recognition errors." Proceedings of the SIGDIAL 2013 Conference. vol. 18. 2013.

Jung, Sangkeun, Cheongjae Lee, and Gary Geunbae Lee. "Three phase verification for spoken dialog clarification." Proceedings of the 11th International conference on Intelligent user Interfaces. ACM, 2006.

Johnston et al., "Mva: The multimodal virtual assistant," In *Proceedings of the 15th Annual Meeting of the Special Interest Group on Discourse and Dialogue (SIGDIAL)*, 2014, pp. 257-259.

Litman et al., "Itspoke: an Intelligent tutoring spoken dialogue system," In *Demonstration Papers at HLT-NAACL 2004*, Stroudsburg, PA, 2004, Association for Computational Linguistics, pp. 5-8.

Acomb et al., "Technical support dialog systems: issues, problems, and solutions," In *Proceedings of the Workshop on Bridging the Gap: Academic and Industrial Research in Dialog Technologies*, 2007, p. 2531.

Bohus et al., "Dialog in the open world: platform and applications," In *Proceedings of the 2009 International conference on Multimodal Interfaces*, 2009, p. 3138.

Bohus et al., "A principled approach for rejection threshold optimization in spoken dialog systems," In *INTERSPEECH*, 2005, pp. 2781-2784.

M. Purver, "The Theory and Use of Clarification Requests in Dialogue," Ph.D. thesis, King's College, University of London, 2004.

Ginzburg et al., "Clarification, ellipsis and the nature of contextual updates," *Linguistics and Philosophy*, vol. 27, No. 3, 2004.

Stoyanchev et al., "Clarification questions with feedback 2012," In *Interdisciplinary Workshop on Feedback Behaviors in Dialog*, 2012.

Stoyanchev et al., "Localized detection of speech recognition errors," In *SLT*, 2012, pp. 25-30, IEEE.

Stoyanchev et al., "Towards natural clarification questions in dialogue systems," In *Proceedings of AISB2014*, 2014.

Henderson et al., "The second dialog state tracking challenge," In *Proceedings of the 15th Annual Meeting of the Special Interest Group on Discourse and Dialogue (SIGDIAL)*, 2014, pp. 263-272.

Sungjin, Lee, "Extrinsic evaluation of dialog state tracking and predictive metrics for dialog policy optimization," In *Proceedings of the 15th Annual Meeting of the Special Interest Group on Discourse and Dialogue (SIGDIAL)*, 2014, pp. 310-317.

Vincent Goffin et al., "The AT&T WATSON speech recognizer," In *Proceedings of ICASSP*, Philadelphia, PA, 2005, pp. 1033-1036.

Mazin Gilbert et al., "Your mobile virtual assistant just got smarter!," In *Proceedings of INTERSPEECH*, 2011, pp. 1101-1104, ISCA.

Alex Liu et al., "Detecting Inappropriate clarification requests in spoken dialogue systems," In *Proceedings of the 15th Annual Meeting of the Special Interest Group on Discourse and Dialogue (SIGDIAL)*, 2014, pp. 238-242.

* cited by examiner

TARGETED CLARIFICATION QUESTIONS IN SPEECH RECOGNITION WITH CONCEPT PRESENCE SCORE AND CONCEPT CORRECTNESS SCORE

BACKGROUND

1. Technical Field

The present disclosure relates to speech recognition and more specifically to localized error detection (LED) and targeted clarification in a spoken language interface system.

2. Introduction

Most natural language dialog systems, upon encountering an error or misinterpretation, employ generic clarification strategies asking a speaker to repeat or rephrase an entire utterance. Human speakers, on the other hand, employ different and diverse clarification strategies in human-human dialog. Further, human speakers of different languages or cultures often use different types of clarification strategies. Targeted clarification questions can be categories into generic and targeted clarification questions. Consider the following exchange:

Speaker A: When did the problems with [power] start?
Speaker B: The problem with what?
Speaker A: Power.

Speaker B asks a targeted question that repeats the part of the utterance recognized correctly as context for the portion believed to have been misrecognized or simply unheard. Reprise questions are a type of a targeted clarification which echo the interlocutor's utterance, such as in Speaker B's query above. In human-human dialogs, reprise questions are much more common than non-reprise questions.

Generic questions are simply requests for a repetition or rephrasing of a previous utterance, such as "What did you say?" or "Please repeat." Such questions crucially do not include contextual information from the previous utterance. Targeted question, on the other hand, explicitly distinguish the portion of the utterance which the system believes has been recognized from the portion it believes requires clarification. Besides requesting information, a clarification question also helps ground communication between two speakers by providing feedback that indicates the parts of an utterance that have been understood. In the above example, Speaker B has failed to hear the word power and so constructs a clarification question using a portion of the correctly understood utterance to query the portion of the utterance they have failed to understand. Speaker B's targeted clarification question signals the location of the recognition error to Speaker A. The targeted clarification question achieves grounding by indicating that the hearer understands the speaker's request for information about 'the problem' but has missed the problem description. In this case, Speaker A is then able to respond with a minimal answer to the question—filling in only the missing information. Current spoken dialog systems do not handle this type of error recovery in a manner comparable to that of human speakers.

DETAILED DESCRIPTION

A system, method and computer-readable storage devices are disclosed which target clarification questions using a spoken or visual modality, while simultaneously grounding the understood concepts, thereby enabling a user to target the response to the clarification with a concise answer. This can be important for newly emerging virtual assistant systems that accept long sentences containing multiple concepts. Generic clarification with the user repeating the entire utterance in these systems is likely to be highly inefficient. A system operating per this disclosure and asking targeted clarification questions will appear more intelligent to the user, and appear as a more helpful virtual agent. The system disclosed herein focuses on an improved approach for error detection in systems with a finite set of concepts.

A system operating according to this disclosure can use localized error detection (LED) and targeted clarification in spoken dialogs. An LED component applies models to speech recognition output and detects segment(s) that are likely to have been misrecognized by an automatic speech recognizer. LED can operate as a post-processor to a speech recognizer and can use context information that is not available to a speech recognizer, such as dialog history and probabilities of concept co-occurrences.

A system implementing the LED and targeted clarifications set forth herein can operate in a domain with a finite set of concepts, such as movie title, restaurant name, date, time, location, etc. LED and targeted clarifications can also be applied in generic domains with a finite set of named-entity types such as location, person, organization, etc. For each concept/entity type, LED applies machine learning to predict whether a concept/entity type is present and whether the concept/entity type is correct. Throughout the disclosure, the concept/entity type is referred to simply as "concepts." The novelty and uniqueness of this approach is the use of two separate models for presence and for correctness prediction.

LED can jointly determine segments of the ASR hypothesis that are correct and segments that are incorrect or questionable. LED applies two models to the speech recognition result: a Correctness model that predicts whether a concept's interpretation is correct, and a Presence model that predicts whether a concept type is present in the actual utterance. For example, for the utterance "action movies in boston" and speech recognition hypothesis "action movies in Austin," the concept interpretations are movie_category=action, location=austin. The movie_category concept is both correct and present whereas the location concept is present but not correct.

LED uses two distinct models for Correctness and Presence because the features relevant for prediction may be different for each model and application. For example, the model of concept presence may rely on dialog context information, while dialog context may not have discriminative power for predicting concept correctness. Model duality can increase domain independence since, hypothetically, the Correctness model may be suitable for any domain, whereas the Presence model may require more domain-dependent features.

The recognition result is the input for LED. The recognition result can contain a number of features that are relevant for prediction: word scores, concept segments, n-best lists, etc., and the dialog context. The output of LED is two lists of (concept, score) pairs: one for correctness and one for presence. The score represents the probability that the concept is correct or concept is present, respectively. The scores then govern system clarification behavior.

For example, the user provides the spoken input "classical music in Philadelphia." The input to the LED component can be an ASR Result indicating that the 1-best result is "classical music in fields." The output of the LED component can be a Correctness Model indicating [[music, 0.99], [location:0.2] . . . ], and a Presence Model indicating [[music, 0.99], [location:0.99] . . . ]. Then, based on those results, the system can target a specific clarification only for the location in the Correctness Model. One such targeted clarification can be "Where did you want classical music?"

Virtually any general-purpose classification approach can be used to create the Correctness and Presence Models. In one proof of concept, multiple classifiers were trained using varying feature sets, one with a Maximum Entropy Classifier and one with a Support Vector Machine. The proof of concept also compares two feature sets: a strong baseline set (BL) that disregards the segment and hypothesis length, and an experimental set (Exp) that includes length information. The proof of concept models were evaluated on a set of approximately 200 utterances with a possible 10 different concepts. In this test set, 10.9% of the concepts are correct and 11.4% are present. This is expected, as most utterances have only 2 or 3 concepts present at the same time. The proof of concept was evaluated by comparing the number of true accepts at the equal error rate, where the percent of false accept and false rejects is very close. The table below shows the percent of the total possible concepts over all of the utterances.

| Method | False-Accept | False-Reject | True-Accept |
|---|---|---|---|
| CORRECTNESS | | | |
| MaxEnt-BL | 1.1% | 1.2% | 9.6% |
| SVM-BL | 1.2% | 1.2% | 9.6% |
| SVM-Exp | 1.1% | 1.1% | 9.8% |
| MaxEnt-Exp | 1.0% | 1.0% | 9.9% |
| PRESENCE | | | |
| MaxEnt-BL | 1.5% | 1.5% | 9.9% |
| SVM-BL | 1.4% | 1.8% | 9.6% |
| SVM-Exp | 1.5% | 1.7% | 9.8% |
| MaxEnt-Exp | 1.7% | 1.8% | 9.7% |

For the Correctness Model, the experimental Maximum Entropy model reduces both false accepts and rejects, while having the most percentage of true accepts (90% of the total number of correct concepts). For the Presence Model, the baseline model that disregards length performs the best. This differing result emphasizes the importance of using two models for Localized Error Detection (LED).

Using the two separate models for LED can provide several benefits. First, two separate models for LED is a simple, highly modular solution, and creates independent probabilities for each concept. Therefore, the approach can be scaled easily to include new concepts or entities. Second, since each model is driven by a simple classifier, personalization information can be easily incorporated into the feature vector to build specific models for a particular user. These models can then easily be interpolated to build adaptable generic models. Third, the dual models make producing natural language generation (Targeted Clarifications) easier by partitioning the probability space of both models.

Such a system for conducting spoken dialogs can be constructed in various embodiments and configurations. Some of the various embodiments of the disclosure are described in detail below. While specific implementations are described, it should be understood that this is done for illustration purposes only. Other components and configurations may be used without parting from the spirit and scope of the disclosure. A brief introductory description of a basic general purpose system or computing device in FIG. 1 which can be employed to practice the concepts, methods, and techniques disclosed is illustrated. A more detailed description of the dual models for LED will then follow.

Figure 1:
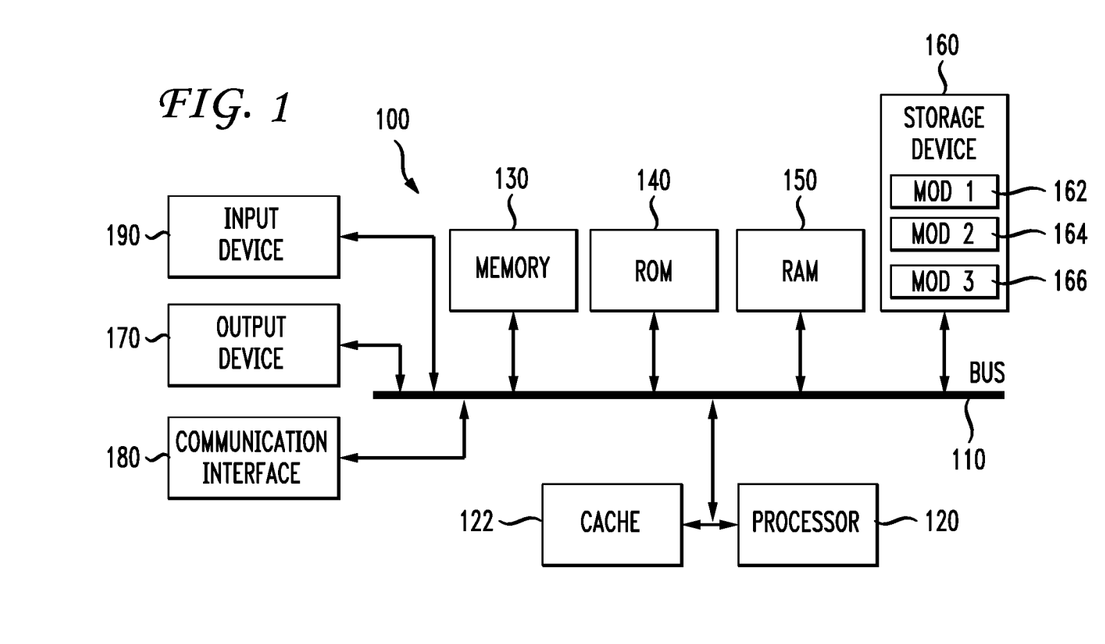
FIG. 1 illustrates an example system embodiment.

With reference to FIG. 1, an exemplary system and/or computing device 100 includes a processing unit (CPU or processor) 120 and a system bus 110 that couples various system components including the system memory 130 such as read only memory (ROM) 140 and random access memory (RAM) 150 to the processor 120. The system 100 can include a cache 122 of high-speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various operations or actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the processor. The processor 120 may be a self-contained computing system, containing multiple cores or processors, a bus, memory controller, cache, etc. A multi-core processor may be symmetric or asymmetric. The processor 120 can include multiple processors, such as a system having multiple, physically separate processors in different sockets, or a system having multiple processor cores on a single physical chip. Similarly, the processor 120 can include multiple distributed processors located in multiple separate computing devices, but working together such as via a communications network. Multiple processors or processor cores can share resources such as memory 130 or the cache 122, or can operate using independent resources. The processor 120 can include one or more of a state machine, an application specific integrated circuit (ASIC), or a programmable gate array (PGA) including a field PGA.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like.

The storage device 160 can include software modules 162, 164, 166 for controlling the processor 120. The system 100 can include other hardware or software modules. The storage device 160 is connected to the system bus 110 by a drive interface. The drives and the associated computer-readable storage devices provide nonvolatile storage of computer-readable instructions, data structures, program modules and other data for the computing device 100. In one aspect, a hardware module that performs a particular function includes the software component stored in a tangible computer-readable storage device in connection with the necessary hardware components, such as the processor 120, bus 110, display 170, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 100 is a small, handheld computing device, a desktop computer, or a computer server. When the processor 120 executes instructions to perform "operations", the processor 120 can perform the operations directly and/or facilitate, direct, or cooperate with another device or component to perform the operations.

Although the exemplary embodiment(s) described herein employs the hard disk 160, other types of computer-readable storage devices which can store data that are accessible by a computer, such as magnetic cassettes, flash memory cards, digital versatile disks (DVDs), cartridges, random access memories (RAMs) 150, read only memory (ROM) 140, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage devices. Such logical operations can be implemented as modules configured to control the processor 120 to perform particular functions according to the programming of the module. For example, FIG. 1 illustrates three modules Mod 1 162, Mod 2 164 and Mod 3 166 which are modules configured to control the processor 120. These modules may be stored on the storage device 160 and loaded into RAM 150 or memory 130 at runtime or may be stored in other computer-readable memory locations.

One or more parts of the example computing device 100, up to and including the entire computing device 100, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization computing layer can operate on top of a physical compute layer. The virtualization computing layer can include one or more of a virtual machine, an overlay network, a hypervisor, virtual switching, and any other virtualization application.

The processor 120 can include all types of processors disclosed herein, including a virtual processor. However, when referring to a virtual processor, the processor 120 includes the software components associated with executing the virtual processor in a virtualization layer and underlying hardware necessary to execute the virtualization layer. The system 100 can include a physical or virtual processor 120 that receives instructions stored in a computer-readable storage device, which cause the processor 120 to perform certain operations. When referring to a virtual processor 120, the system also includes the underlying physical hardware executing the virtual processor 120.

Figure 2:
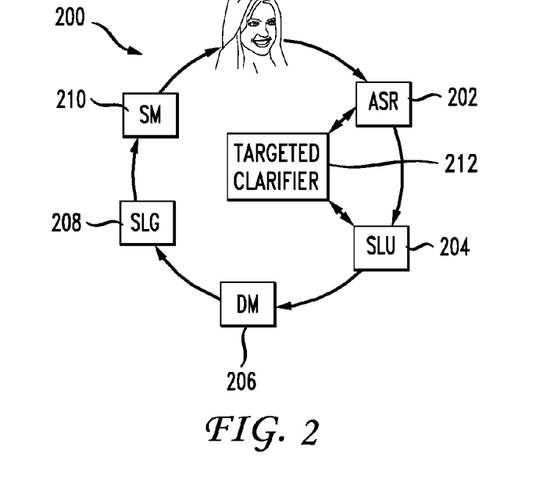
FIG. 2 illustrates a functional block diagram that illustrates an exemplary natural language spoken dialog system with a targeted clarifier.

Having disclosed some components of a computing system, the disclosure now turns to FIG. 2, which illustrates an exemplary natural language spoken dialog system with a targeted clarifier. FIG. 2 is a functional block diagram that illustrates an exemplary natural language spoken dialog system. Spoken dialog systems aim to identify intents of humans, expressed in natural language, and take actions accordingly, to satisfy their requests. Natural language spoken dialog system 200 can include an automatic speech recognition (ASR) module 202, a spoken language understanding (SLU) module 204, a dialog management (DM) module 206, a spoken language generation (SLG) module 208, and synthesizing module 210. The synthesizing module can be any type of speech output module. For example, it can be a module wherein one prerecorded speech segment is selected and played to a user. Thus, the synthesizing module represents any type of speech output. The present disclosure focuses on innovations related to the ASR module 202 and can also relate to other components of the dialog system.

The automatic speech recognition module 202 analyzes speech input and provides a textual transcription of the speech input as output. SLU module 204 can receive the transcribed input and can use a natural language understanding model to analyze the group of words that are included in the transcribed input to derive a meaning from the input. The role of the DM module 206 is to interact in a natural way and help the user to achieve the task that the system is designed to support. The DM module 206 receives the meaning of the speech input from the SLU module 204 and determines an action, such as, for example, providing a response, based on the input. The SLG module 208 generates a transcription of one or more words in response to the action provided by the DM 206. The synthesizing module 210 receives the transcription as input and provides generated audible speech as output based on the transcribed speech.

Thus, the modules of system 200 recognize speech input, such as speech utterances, transcribe the speech input, identify (or understand) the meaning of the transcribed speech, determine an appropriate response to the speech input, generate text of the appropriate response and from that text, generate audible "speech" from system 200, which the user then hears. In this manner, the user can carry on a natural language dialog with system 200. Those of ordinary skill in the art will understand the programming languages for generating and training automatic speech recognition module 202 or any of the other modules in the spoken dialog system. Further, the modules of system 200 can operate independent of a full dialog system. For example, a computing device such as a smartphone (or any processing device having a phone capability) can include an ASR module wherein a user says "call mom" and the smartphone acts on the instruction without a "spoken dialog." A module for automatically transcribing user speech can join the system at any point or at multiple points in the cycle or can be integrated with any of the modules shown in FIG. 2.

A targeted clarifier module 212 can integrate with the ASR module 202, the SLU module 204, or a natural language understanding (NLU) module (not shown). The targeted clarifier module 212 can implement localized error detection by serving as a post processor to the ASR module 202, and can use context that is not available to the ASR module 202. The targeted clarifier module 212 enables the DM module 206 to target clarification questions using spoken or visual modality, while simultaneously grounding the understood concepts. The targeted clarifier module 212 uses a combination of a correctness model and a presence model, as discussed below, to identify which parts of an input utterance are recognized, as well as the certainty of the recognition of those parts. The targeted clarifier module 212 can examine the confidence of ASR module 202. If the confidence is below a threshold, the targeted clarifier module 212 can generate a targeted clarification question. The targeted clarifier module 212 uses the confidence data to generate targeted clarification questions only about the parts that are unclear. This approach can work well when targeted to a specific domain or a small set of possible contexts.

The targeted clarifier module 212 can further rely on features of confidence of speech recognition of each word and tag in a particular context. The targeted clarifier module 212 can further use domain information history or a history of which concepts go together as context to determine how likely a concept is to be present, or how likely that the concept is correctly recognized. For example, if the recognizer recognizes a word with high certainty, but the context indicates that that word is unsuitable for the given context, the targeted clarifier module 212 can generate a targeted clarification question to disambiguate.

The targeted clarifier module 212 can generate targeted clarification questions further based on data such as other words in the utterance, word by word confidence scores, contextual features of the recognized text or dialog, tagging scores, n-best lists of recognition results, and so forth.

Having disclosed some components of a computing system, the disclosure now returns to the dual model approach for localized error detection for targeted clarification. The system uses targeted clarifications when a user's utterance is partially recognized. For example, in response to a same utterance, the system can ask "What type of movies do you want to see?" or "When do you want to see a comedy at Angelika Film Center?" depending on which part of the utterance the system has misrecognized or about which the system is uncertain. A targeted clarification strategy uses localized error detection (LED) via an LED component that identifies when a targeted clarification is appropriate by detecting potential errors in an automatic speech recognizer (ASR) or natural language understanding (NLU) unit assigned to the user input. The system set forth herein uses targeted clarifications in a multimodal virtual agent system (MVA) providing access to information about movies, restaurants, musical events, or other closed-domain data, or data in a finite, defined set. In contrast with open-domain spoken systems, the MVA application covers a domain with a fixed set of concepts and uses an NLU component to mark concepts in automatically recognized speech. Instead of identifying an error segment, LED in MVA identifies which of the concepts are likely to be present and correct using domain knowledge, ASR, and NLU tags and scores. If at least one of the concepts is identified to be present but not correct, the targeted clarification (TC) component uses this information to generate a targeted clarification question. The system can compute probability distributions of concept presence and correctness for each user utterance, for automatic learning of a clarification policy.

Figure 3:
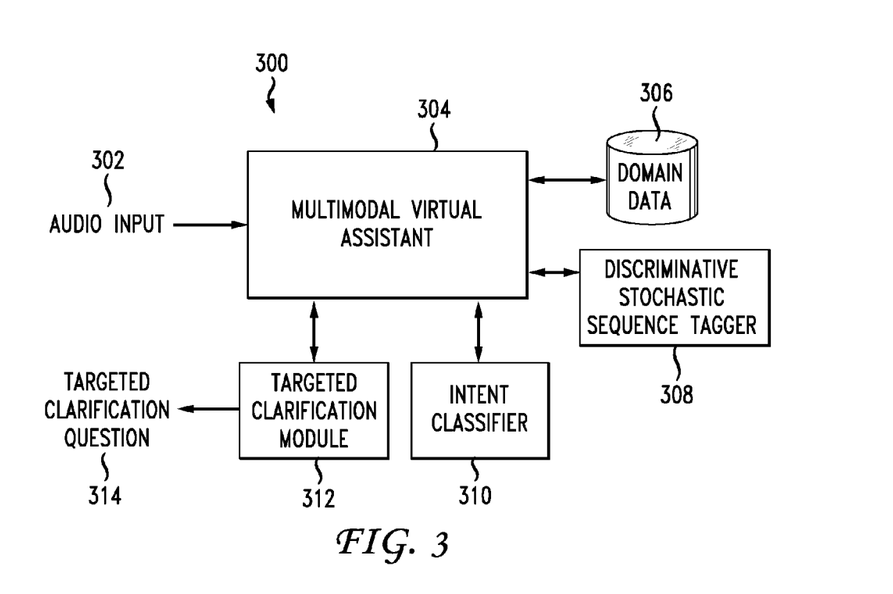
FIG. 3 illustrates an example flowchart for generating targeted clarification questions.

FIG. 3 illustrates an example architecture 300 for generating targeted clarification questions. A Multimodal Virtual Assistant (MVA) 304 receives audio input 302. In one embodiment, the MVA 304 is a mobile application that allows users to plan a day or evening out with friends using spoken natural language commands and gesture input. Users can search and browse over multiple interconnected domains such as music events, movie showings, and places to eat. Different sets of domain data 306 can be used for different applications, such as song titles, lyrics, artists, and producers for a pop music application.

A speech recognition engine can process the audio input. An example speech recognition engine is the AT&T Watson speech recognition engine. The recognition can utilize, for example, a generic statistical N-gram language model trained on data from a broad range of different domains. The system can perform natural language understanding in two steps. First, a discriminative stochastic sequence tagger 308 assigns domain specific concept tags to phrases within the input. An intent classifier 310 then uses a combination of lexical features with phrase tags to assign the input to one of a set of intents. A targeted clarification module 312 can then determine whether a targeted clarification question 314 is needed, and can generate the targeted clarification question 314 for output in response to the audio input.

Experimental data for this architecture used an initial set of 2499 spoken user inputs that were collected in an initial trial version of the architecture. The utterances were manually transcribed and annotated with semantic tags and intents. Although not a controlled data collection, the recorded commands are nevertheless representative of the typical usage of the system. The MVA domain data 306 in the experiment had twelve concepts distributed across movies, music, restaurants, and three general concepts that apply across all of the domains (see Table 1).

TABLE 1

| Domain | Tag |
|---|---|
| movies | MOVIE_EVENT_CAT |
|  | MOVIE_EVENT_VENUE |
|  | MOVIE_EVENT_TITLE |
| music | MUSIC_GENRE |
|  | MUSIC_EVENT_PERFORMER |
|  | MUSIC_EVENT_VENUE |
| restaurants | CUISINE |
|  | RESTAURANT_NAME |
|  | CHAIN_RESTAURANT |
| general | LOCATION |
|  | NEIGHBORHOOD |
|  | TIME |

A user's command specifies search criteria or refines search criteria using one or more of the concept types. For example, a natural language understanding (NLU) component can apply concept tags to a user command "Jazz concerts in San Francisco next Saturday" as: [Jazz]/MUSIC GENRE concerts around [San Francisco]/LOC [next Saturday]/TIME.

The experimental corpus contained 748 unique commands (see Table 2). 6% of these commands do not contain any tagged concepts, such as general searches, e.g. 'restaurants', or out-of-domain commands. 38% contain a single concept, such as 'restaurants in LOC'. The majority of the utterances contain more than one concept. 41% contains 2 concepts (e.g. CUISINE in LOC) and 14% contain 3 concepts (e.g. CUSINE in LOC TIME).

TABLE 2

| Number of Concepts | Total | Unique |
|---|---|---|
| 0 | 11.96% (299) | 6% (45) |
| 1 | 47.46% (1186) | 38% (285) |
| 2 | 32.77% (819) | 41.69% (311) |
| 3 | 7.72% (193) | 14.2% (106) |
| All | 2499 | 746 |

The system applies to the commands with at least one concept present and uses targeted clarification policy to recover from recognition and/or understanding errors in these commands.

The NLU component tags an automatically recognized input string. The baseline MVA system either accepts or rejects an utterance based on the NLU confidence score. Upon acceptance, the system executes the user's command. Upon rejection, the system asks a generic clarification, e.g. please repeat. In addition to accept and reject actions, the system may also ask a targeted clarification (TC action). The localized error detection (LED) component consists of the presence and correctness prediction modules (PRES, CORR) and the dialogue manager (DM). The LED component identifies mistakes in the ASR and the NLU of the system and the DM component uses this input to determine a desired system action, such as whether to pose a targeted clarification question, and what type of targeted clarification question to pose.

The system can train maximum entropy models for binary classification of presence and correctness for each concept used in the MVA system. The models can be trained, for example, on the features generated by the ASR and NLU system components (see Table 3). Lexical features (LEX) are the words, bigrams, and trigrams from the 1-best ASR output. The NLU features include overall NLU confidence score and NLU-per-concept features. For each concept identified by the NLU module, we compute the average ASR score of the words tagged with the concept, ASR score variance, and number of words in this concept.

TABLE 3

| Feature | Description |
|---|---|
| LEX | words from the ASR output |
| NLU-conf | overall NLU confidence score |
|  | for each NLU-tagged concept: |
| NLU-concept-score | average ASR confidence of tagged words |
| NLU-concept-var | variance of the ASR confidence of tagged words |
| NLU-concept-num | number of tagged words |

The presence model returns for each of the twelve MVA concepts the probability that it is present in the input. The correctness model returns the probability for each concept of whether it is recognized correctly by the ASR. A set of present and correct concepts were identified through thresholds empirically derived on development data.

The Dialogue Manager (DM) 206 identifies a set of present & incorrect (PI) and present & correct (PC) concepts from the result of PRES and CORR models. Using the following algorithm, DM selects the next system action:

DEFINITIONS

PRESENT: the set of concepts with presence probability above threshold

CORRECT: the set of concepts with correct probability above threshold

PC: PRESENT ∩ CORRECT

PI: PRESENT ∩ not CORRECT

ALGORITHM

If the set of PI is empty, accept the utterance.

Else, if the set of PC is empty, reject the utterance

Else, ask a targeted clarification question (look up in a table of manually defined questions for sets of PC and PI).

Table 4 below shows an example of processing a partially misrecognized sentence "Jazz concerts in San Francisco tonight." ASR and NLU correctly recognize and identify the MUSIC GENRE ("jazz") and the TIME ("tonight") concepts but fail to recognize and identify the LOC concept. The set of present & correct (PC) in this example includes MUSIC GENRE and TIME. The set of present & incorrect (PI) in this example includes LOC. Using this information the DM looks up a clarification question template querying the LOC, and instantiates it with the correctly recognized values for the concepts MUSIC, GENRE, and TIME.

TABLE 4

| | ASR/NLU output |
|---|---|
| Sent | Jazz concerts in San Francisco tonight |
| ASR | Jazz concerts in ERROR tonight |
| NLU | MUSIC_GENRE TIME |
| | LED Prediction |
| PRES | MUSOC_GENRE, TIME, LOC |
| CORR | MUSIC_GENRE, TIME |
| | DM Table Lookup Values |
| PC | MUSIC_GENRE, TIME |
| PI | LOC |
| Template | Where do you want to see MUSIC_GENRE concerts TIME? |
| Result | Where do you want to see Jazz concerts tonight? |

The system can compute precision, recall, F-measure, and sentence concept accuracy for each of the models to evaluate the PRES and CORR components. Experimental data was gathered with 10-fold cross validation on the data set of 2499 sentences automatically recognized with a generic language model. True concept presence for the experimental data was identified from the manual annotations on the reference transcript. True concept correctness for the experimental data was identified by matching concept strings in the reference transcripts and automatic ASR/NLU output. A maximum entropy classifier returned probability of presence/correctness for each concept.

Precision of the presence model is the proportion of concepts correctly identified by the model as 'present.' Recall of the presence model is the proportion of concepts in reference that were successfully identified by the model as 'present.' Sentence concept accuracy is the proportion of all sentences in the data set where the model's prediction matches exactly actual presence of the concepts in a reference.

The majority baseline assigning the most frequent set of concepts (LOC and MUSIC GENRE occurring in 15.9% of the sentences) achieves F-measure of 0.45. The NLU baseline method uses output of the NLU system to predict presence by assigning True to the 'presence' value for each concept correctly tagged by the NLU model. NLU baseline method achieves F-measure of 0.82 and sentence accuracy of 67.4%. Using LEX features, the model achieves F-measure of 0.90 and sentence accuracy of 77.6%. Using NLU features, the model achieves F-measure of 0.82 and sentence accuracy of 66.4%, which is equivalent to the performance of the NLU system baseline. Not surprisingly, applying the maximum entropy classifier to the NLU features does not improve the performance over the NLU system baseline because NLU features are not indicative of concept presence. The performance using a combination of LEX & NLU features is equivalent to the performance using LEX features alone and outperforms the NLU system baseline by 10.4% points absolute on the sentence accuracy measure.

Precision of the correctness model is the proportion of concepts identified by the model as 'correct' that are correctly recognized by the system. Recall of the correctness model is the proportion of correctly identified concepts that the model successfully identified as 'correct'. The Present-predicted baseline assigns 'correct' tag using presence model assignment with LEX & NLU, T=0.5 parameters and achieves 66.4% overall sentence accuracy. The NLU system baseline assigns 'correct' tag to all concepts tagged and recognized by the system correctly and achieves 80.2% sentence accuracy. It has a recall of 1.0 as the set of correct hypothesis tags is a subset of all correctly recognized tags.

With LEX features alone, the model achieves F-measure of 0.93 (0.05 points above the NLU system baseline) and sentence accuracy 88.3%. The increase in performance using LEX features alone over the baseline is due to the correctness models combined presence and correctness: a concept can be correct only when it is present. Hence, the correctness model benefits from lexical features for the same reasons as the presence model. With NLU features alone, the model achieves F-measure 0.91 (0.03 points above the NLU system baseline) and sentence accuracy 83.4%. Combining LEX & NLU features, the model achieves F-measure of 0.94 (0.06 points above the NLU system baseline) and sentence accuracy of 88.8% outperforming each individual feature sets. While LEX features are the most salient in the prediction of correctness NLU features are also useful.

Asking a targeted clarification instead of a rejection will result in an inappropriate clarification question. An inappropriate question contains a misrecognized concept misclassified by the correctness model. The system can also use targeted clarifications for error recovery from ASR and NLU errors in a virtual assistant dialog system. A targeted clarification strategy can provide a more natural and efficient user interface and experience compared to the generic rejection strategy commonly used for error recovery.

Figure 4:
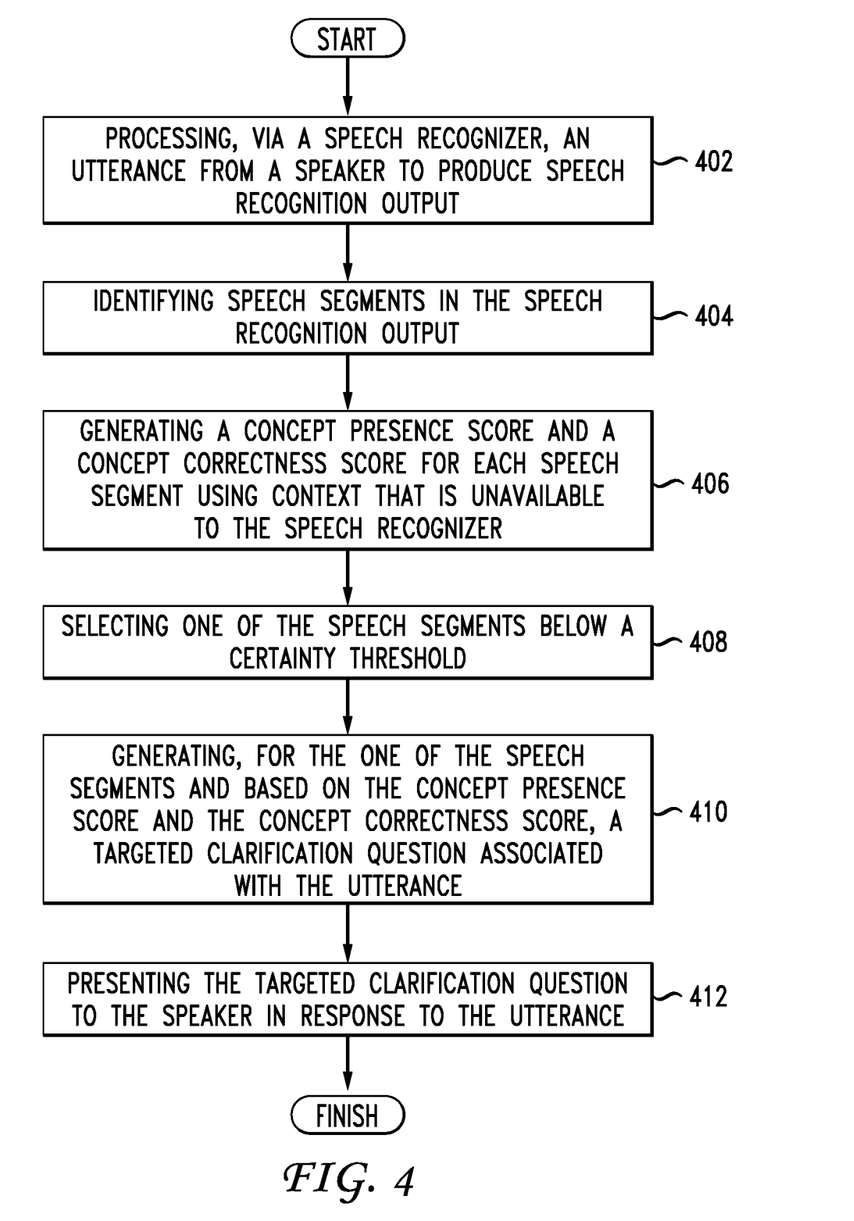
FIG. 4 illustrates an example method embodiment.

FIG. 4 illustrates an example method embodiment. The example system implementing the method embodiment can process, via a speech recognizer, an utterance from a speaker to produce speech recognition output (402). The system can identify speech segments in the speech recognition output (404). The system can generate a concept presence score and a concept correctness score for each speech segment using context that is unavailable to the speech recognizer (406). The system can select one of the speech segments below a certainty threshold (408). The system can generate, for the one of the speech segments and based on the concept presence score and the concept correctness score, a targeted clarification question associated with the utterance (410). The system can present the targeted clarification question to the speaker in response to the utterance (412).

In many situations, the system will identify a single word or phrase in an utterance with a recognition confidence below a threshold. In this case, the system can generate a straightforward clarification question. However, if the system identifies multiple words or phrases in the utterance, each having a recognition confidence below the threshold, the system must decide how to handle the situation. The system can use a rule-based approach to determine which misrecognized words to clarify in a targeted clarification question. For example, the rules can specify to clarify the misrecognized word with the lowest confidence, or a largest set of misrecognized words which can be used together in a single targeted clarification question, or a misrecognized word which, when clarified, would provide more or higher quality context to better understand any remaining misrecognized words. The rules can be based on data or models that show what is correct and what is present but incorrect. The rules can be user-specific, tailored to how a particular user or class of users interacts via spoken dialog.

The localized error detection (LED) can provide information about presence and correctness of concepts, and can match that against a set of templates to pick the right type of targeted clarification question to form. For example, if LED predicts that two concepts are present, and one is correct and the other is incorrect, the system can select a targeted clarification question template based on what the concepts are. For example, if LED determines that the "type_of_restaurant" concept is correct, but "location" is incorrect, the system can select a template such as "Type_of_restaurant where?"

In some situations, the LED predicts two different options for a same, present concept. In this case, the system can select a targeted clarification question asking about both of the options. For example, if the user says "Show me plane tickets to Boston," the system may have a medium certainty, based on context and the speech information, that the correct option is one of "Austin" and "Boston," but neither is significantly more likely than the other. The system can select a targeted clarification question saying, for example, "Where you going again? Boston or Austin?"

The systems set forth herein use models of presence and correctness for generating targeted clarifications. With presence and correctness detection, the system can clarify a substantial portion of errors with targeted clarification. A maximum entropy model trained on a combination of lexical and NLU features can achieve a significant improvement over existing approaches in predicting whether a concept is present and/or correct in a user's utterance. We find that lexical context features are especially useful for the both presence and correctness models. By optimizing presence and correctness thresholds, the system can be tuned to minimize false accept or false reject errors. The system can apply ASR n-best hypotheses and domain knowledge mined from external sources to improve the identification of targeted clarification opportunities as well as generating appropriate targeted clarification questions. The system can automatically optimize the clarification policy using on-line reinforcement learning with real users using output of the presence and correctness models as features.

Embodiments within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

We claim:

1. A method comprising:
    processing, via a speech recognizer, an utterance from a speaker to produce speech recognition output;
    identifying speech segments in the speech recognition output;
    generating two pairs of values for each speech segment including a first pair indicating a concept presence score for a corresponding speech segment and a second pair indicating a concept correctness score for the corresponding speech segment using a context that is unavailable to the speech recognizer throughout a dialog;
    generating, for a chosen speech segment from the speech segments and based on the concept presence score and the concept correctness score, a targeted clarification question associated with the utterance, wherein the chosen speech segment is a recognizable speech segment that has a high recognition certainty in which the context indicates that a word in the chosen speech segment is unsuitable for the context; and
    presenting the targeted clarification question to the speaker in response to the utterance.

2. The method of claim 1, wherein the context that is unavailable to the speech recognizer comprises one of dialog history, a concept co-occurrence probability, domain history, speech recognition confidence scores, contextual features of the utterance, and tagging scores.

3. The method of claim 1, wherein the concept presence score indicates a confidence that a concept type is present in a respective speech segment, and wherein the concept correctness score indicates a confidence that an identification of the concept type is correct.

4. The method of claim 1, wherein the targeted clarification question is generated based on a question template associated with the speech segments.

5. The method of claim 1, further comprising:
    identifying multiple speech segments below a certainty threshold; and generating the targeted clarification question based on respective concept presence scores and concept correctness scores for the multiple speech segments.

6. The method of claim 1, wherein the concept presence score and the concept correctness score are generated based on a domain of available concepts.

7. The method of claim 1, wherein the speech recognizer identifies that at least one of the speech segments has a concept presence score above a certainty threshold.

8. A system comprising:
a processor;
a speech recognizer; and
a computer-readable storage medium having instructions stored which, when executed by the processor, cause the processor to perform operations comprising:
generating two pairs of values for each speech segment including a first pair indicating a concept presence score for a corresponding speech segment and a second pair indicating a concept correctness score for the corresponding speech segment using a context that is unavailable to the speech recognizer throughout a dialog;
generating, for a chosen speech segment from the speech segments and based on the concept presence score and the concept correctness score, a targeted clarification question associated with an utterance, wherein the chosen speech segment is a recognizable speech segment that has a high recognition certainty in which the context indicates that a word in the chosen speech segment is unsuitable for the context; and
presenting the targeted clarification question to a speaker in response to the utterance.

9. The system of claim 8, wherein the context that is unavailable to the speech recognizer comprises one of dialog history, a concept co-occurrence probability, a domain history, speech recognition confidence scores, contextual features of the utterance, and tagging scores.

10. The system of claim 8, wherein the concept presence score indicates a confidence that a concept type is present in a respective speech segment, and wherein the concept correctness score indicates a confidence that an identification of the concept type is correct.

11. The system of claim 8, wherein the targeted clarification question is generated based on a question template associated with the speech segments.

12. The system of claim 8, the computer-readable storage medium having additional instructions stored which, when executed by the processor, cause the processor to perform operations comprising:
identifying multiple speech segments below a certainty threshold; and
generating the targeted clarification question based on respective concept presence scores and concept correctness scores for the multiple speech segments.

13. The system of claim 8, wherein the concept presence score and the concept correctness score are generated based on a domain of available concepts.

14. The system of claim 8, wherein the speech recognizer identifies that at least one of the speech segments has a concept presence score above a certainty threshold.

15. A non-transitory computer-readable storage device having instructions stored which, when executed by a computing device, cause the computing device to perform operations comprising:
generating two pairs of values for each speech segment including a first pair indicating a concept presence score for a corresponding speech segment and a second pair indicating a concept correctness score for the corresponding speech segment using a context that is unavailable to the speech recognizer throughout a dialog;
generating, for a chosen speech segment from the speech segments and based on the concept presence score and the concept correctness score, a targeted clarification question associated with an utterance, wherein the chosen speech segment is a recognizable speech segment that has a high recognition certainty in which the context indicates that a word in the chosen speech segment is unsuitable for the context; and
presenting the targeted clarification question to a speaker in response to the utterance.

16. The non-transitory computer-readable storage device of claim 15, wherein the context that is unavailable to the speech recognizer comprises one of dialog history, a concept co-occurrence probability, domain history, speech recognition confidence scores, contextual features of the utterance, and tagging scores.

17. The non-transitory computer-readable storage device of claim 15, wherein the concept presence score indicates a confidence that a concept type is present in a respective speech segment, and wherein the concept correctness score indicates a confidence that an identification of the concept type is correct.

18. The non-transitory computer-readable storage device of claim 15, wherein the targeted clarification question is generated based on a question template associated with the speech segments.

19. The non-transitory computer-readable storage device of claim 15, having additional instructions stored which, when executed by the computing device, cause the computing device to perform operations comprising:
identifying multiple speech segments below a certainty threshold; and
generating the targeted clarification question based on respective concept presence scores and concept correctness scores for the multiple speech segments.

20. The non-transitory computer-readable storage device of claim 15, wherein the concept presence score and the concept correctness score are generated based on a domain of available concepts.

* * * * *